C. A. & C. P. JESKE.
RECORDING DEVICE.
APPLICATION FILED JAN. 2, 1917.

1,275,263.

Patented Aug. 13, 1918.
3 SHEETS—SHEET 1.

C. A. & C. P. JESKE.
RECORDING DEVICE.
APPLICATION FILED JAN. 2, 1917.

1,275,263.

Patented Aug. 13, 1918.
3 SHEETS—SHEET 2.

Witness:
L. B. Graham

Inventors:
Charles A. Jeske and
Clarence P. Jeske
By J. M. Roberts
their Atty.

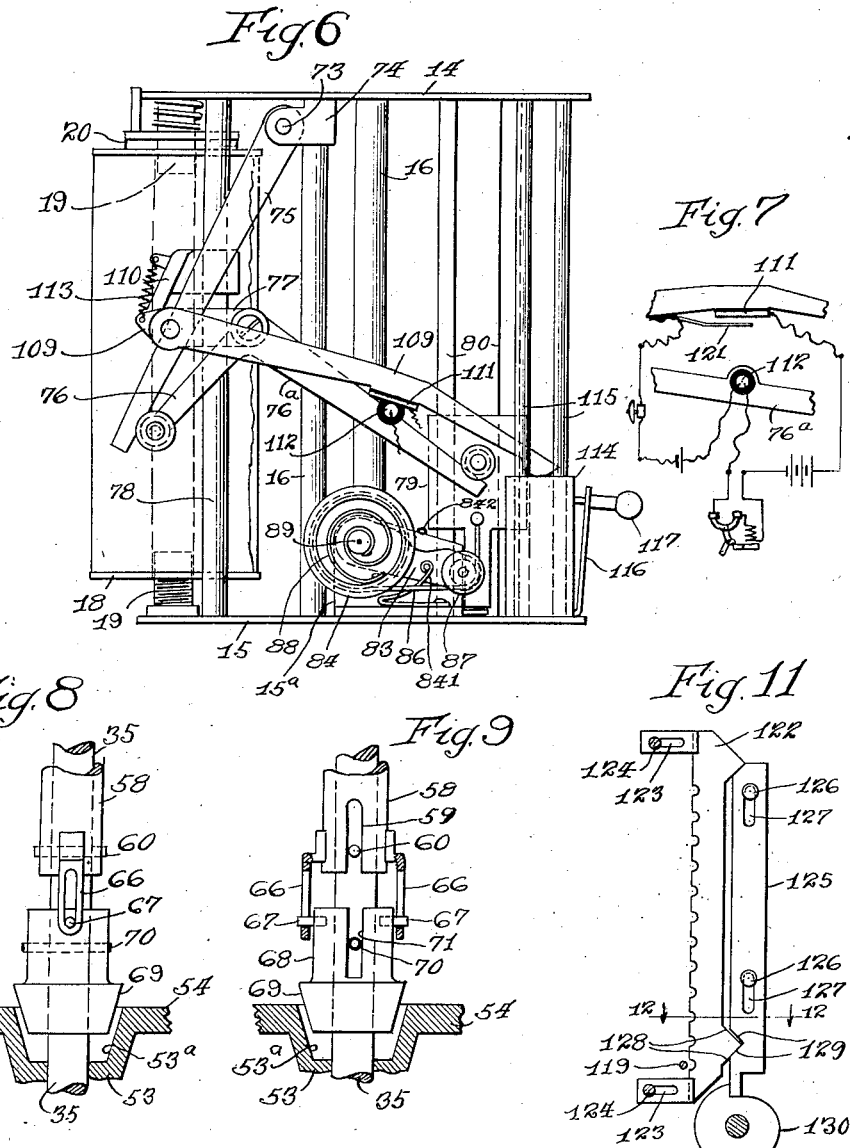

UNITED STATES PATENT OFFICE.

CHARLES A. JESKE AND CLARENCE P. JESKE, OF CHICAGO, ILLINOIS, ASSIGNORS TO THE AUTO-SPEED RECORDER COMPANY, OF CHICAGO, ILLINOIS, A CORPORATION OF ILLINOIS.

RECORDING DEVICE.

1,275,263.

Specification of Letters Patent.

Patented Aug. 13, 1918.

Application filed January 2, 1917. Serial No. 140,011.

*To all whom it may concern:*

Be it known that we, CHARLES A. JESKE and CLARENCE P. JESKE, citizens of the United States, residing at Chicago, in the county of Cook and State of Illinois, have invented certain new and useful Improvements in Recording Devices, of which the following is a specification, reference being had therein to the accompanying drawing.

This invention relates to recorders for vehicles, and consists in the matters hereinafter described and then pointed out in the claims.

In the accompanying drawings—

Fig. 6 is a view in end elevation taken at the left hand end of Fig. 3 with the record-sheet delivery roll in position;

Fig. 7 is a detail view of certain parts;

Figs. 8 and 9 are detail views of the clutch and associated parts;

Fig. 10 is a view illustrating the circuit of the electro-magnets and lights;

Fig. 11 is a detail front view showing the locking device and pin of the control-arm;

Fig. 12 is a detail sectional view on line 12—12 of Fig. 11 and also shows the control arm and the operating hub of a key-lock.

Figure 2:
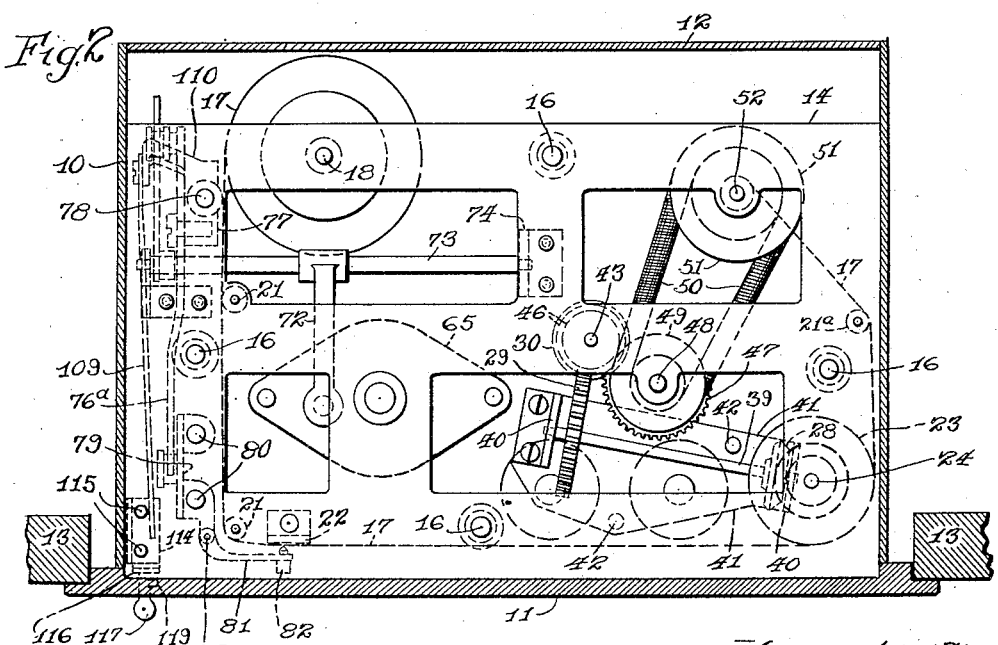
Fig. 2 is a top plan view of the internal mechanism taken on the line 2—2 of Fig. 1 with the case in section.

In the present and preferred embodiment of this invention, we employ an inclosing case 10 of any suitable size having a removable glass-panel covering a rectangular opening in its front 11 and a removable rear cover 12; the case is mounted in any desired position on the vehicle, as on the dash or instrument-board of an automobile as indicated at 13 in Fig. 2. The top and bottom bearing-plates 14 and 15 respectively are rigidly connected by pillars 16 to form the frame on which the internal mechanism is mounted. The record-sheet 17 is made of a suitable length of material, ordinarily being composed of paper, and is carried as a roll upon a delivery roll 18 which is detachably mounted in bearings 19 on the frame and is held against free rotation by means of a spring-pressed brake-disk 20 which enables the sheet to be gradually unwound therefrom but serves to keep it stretched or under slight tension. The record sheet passes over guide-rollers 21 to the front of the case and across a platen 22 located at the left-hand edge of the glass panel and extending vertically from top to bottom of the frame, and thence across the glass panel to a feed wheel or drum 23 mounted on a vertical shaft 24 journaled in the frame and preferably provided with peripheral pins or teeth 25 to engage the side margins of the sheet, and thence over a guide roller 21ª to the receiving roll 26 which is detachably mounted in the frame, it being understood that the case is extended rearwardly beyond the frame to allow space for the rolls of paper and that its rear cover 12 is detachable to allow the rolls 18 and 26 to be removed and replaced.

The sheet is wound upon the receiving roll 26 which is operated by winding and tensioning mechanism as hereinafter described to act as a take-up roller. The feed-drum 23 is divided into upper and lower sections in order to conveniently mount an intermediate bevel-gear 27 on its shaft 24, which is driven by a train of gears 28, 29, 30, 31, 32, 33 and 34; the shaft 35 of the last named gear is the drive shaft and its lower end projects through the bottom of the case where it is provided with a key-way 36 so that a power shaft may be readily attached to it. The shaft 35 is provided with a roller-bearing 37 near its lower end, and its upper end is journaled in a removable bearing 38 in the top plate. The bevel gear 28 and the worm-gear 29 are at opposite ends of a short cross-shaft 39 journaled in bearings 40 on a plate 41 carried about intermediate the height of the frame by short uprights 42. The worm 30 meshing with the worm-gear 29 is secured on an upright shaft 43 journaled in the frame and carrying the worm-gear 31 near its lower end which meshes with the worm 32 on a short cross-shaft 44 mounted in bearings 45 on the bottom plate and carrying the worm-gear 33 which in turn meshes with the worm 34 fixed on the drive shaft 35. The shaft 43 carries near its upper end a small gear 46 which meshes with a larger gear 47 mounted on a stub-shaft 48 and secured to a sheave 49, and a coiled-spring drive-belt 50 connects the sheave 49 with a larger sheave 51 also mounted on a stub-shaft 52 on the top plate and suitably connected with the spool of the receiving roll 26 to form the tension drive of the latter. The spool of roll 26 is detachably connected to the sheave 51 by any suitable means, and when the shaft 43 is driven the spring-belt 50 transmits motion to the receiving-roll 26 to take up all slack in the record strip between the latter and the drum 23, and slips on its sheaves when the strip is taut between these parts.

The drive shaft 35 being actuated by the power shaft suitably driven from one of the wheels or axles of the vehicle on which the recorder is mounted will vary in speed in accordance with the speed of the vehicle, and the speed of the drum-shaft 24 corresponds with the speed of the shaft 35 to regulate the velocity at which the record sheet travels, the train of transmitting gears being arranged to appropriately step down the speed of the shaft 24.

The shaft 35 is provided above the gear 34 with a revolving collar 53 which carries a fixed gear 54 meshing with a smaller gear 55 fast on the upper end of a short vertical shaft 56 journaled in bearings in the lower plate 14 and in a bracket 57, these gears being in the ratio of 6 to 1. The shaft 56 is part of the initial or primary governor for the speed-recording pencil as hereinafter described. The lower end of the collar fits the shaft to freely revolve thereon and its upper end is slightly enlarged to afford a beveled cup 53ª whose upper inner diameter corresponds with the eye of the gear 54. The shaft 35 also carries above the gear 54 a sleeve 58 which slides longitudinally thereon but rotates therewith by means of opposite elongated slots 59 in the sleeve engaging a cross-pin 60 in the shaft. Opposite pairs of crossed governor-arms 61 are pivotally mounted on the shaft 35 to rotate therewith, these arms being pivoted at their centers on the pin 60, and the corresponding ends of the arms are connected by crosspins 62 to which counter-weights 63 are suitably attached. The lower pins 62 afford pivotal connections for an opposite pair of links 64 which extend upwardly and outwardly and are pivotally connected at their upper ends to a plate 65 fixed to the upper end of the sleeve 58, so that as the governor arms are thrown outwardly the plate and sleeve will rise on the shaft 35. The lower end of the sleeve 58 is provided with an opposite pair of downwardly projecting slotted links 66 which when the sleeve is raised a predetermined distance are adapted to connect with pins 67 on the upper end of a second collar 68 which is provided at its lower end with a beveled perimeter 69 forming a clutch face adapted to enter and frictionally engage the cup of the gear 54, the collar 68 being connected to slide on and revolve with the driving shaft by pin 70 on the shaft engaging longitudinal slots 71 in the collar. The slots of the links 66 are slightly elongated so as to provide a lost-motion connection between the sleeve 58 and the collar 68 so that the former may move upwardly on the shaft to a predetermined point before the clutch-face of the collar 68 will be withdrawn from engagement with the cup of the gear 54.

On the upper face of the plate 65 rests the free end of a rocker-arm 72 whose other end is fixed to a rock-shaft 73 secured in bearings 74 on the under face of the upper plate 14. The shaft 73 is provided at its outer end with a rocking lever 75 which is movably connected near its free end with the short arm 76 of a bell-crank lever pivotally mounted on a bracket 77 carried by an upright 78, the long arm 76ª of the bell-crank lever being forwardly directed to movably engage a sliding carriage 79 which is mounted for up and down motion on suitable guide rods 80 extending vertically of the frame. The carriage carries a forwardly projecting recording arm 81 which is equipped with a pencil 82 opposite the platen 22 and adapted to mark upon the record sheet as the latter is drawn over the platen.

Figure 1:
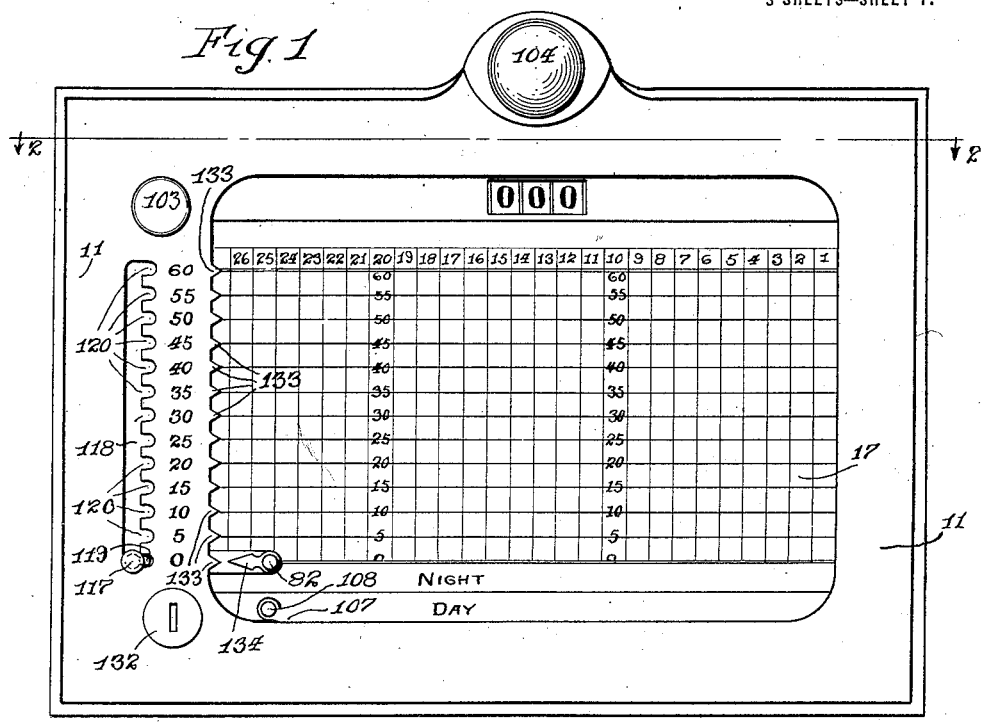
Figure 1 is a view in front elevation of a recorder embodying the features of our invention.
Figure 3:
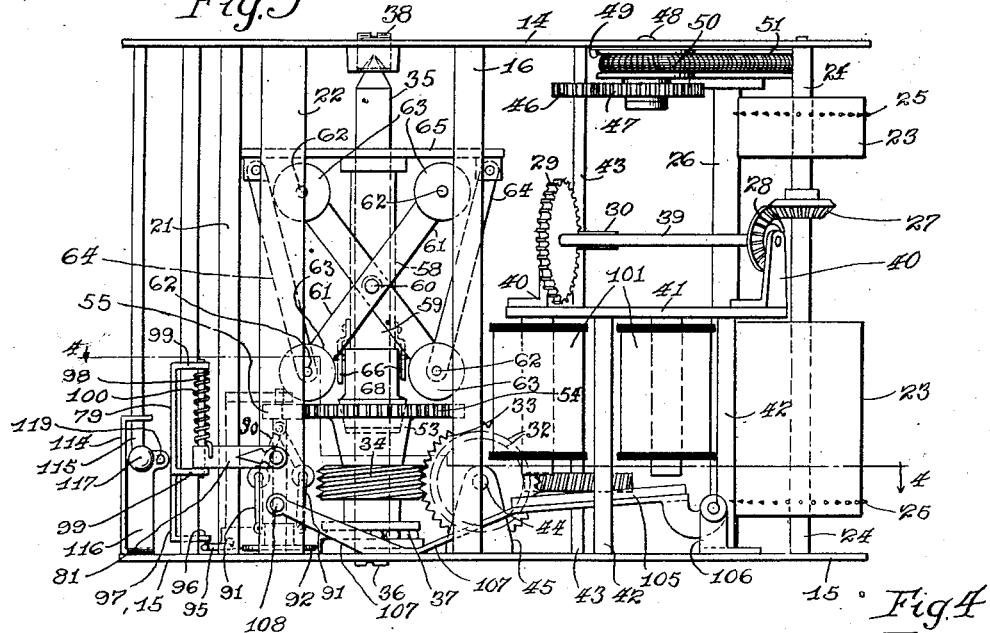
Fig. 3 is a view in front elevation of the internal mechanism with the front of the case removed and the record sheet omitted.
Figures 4, 5:
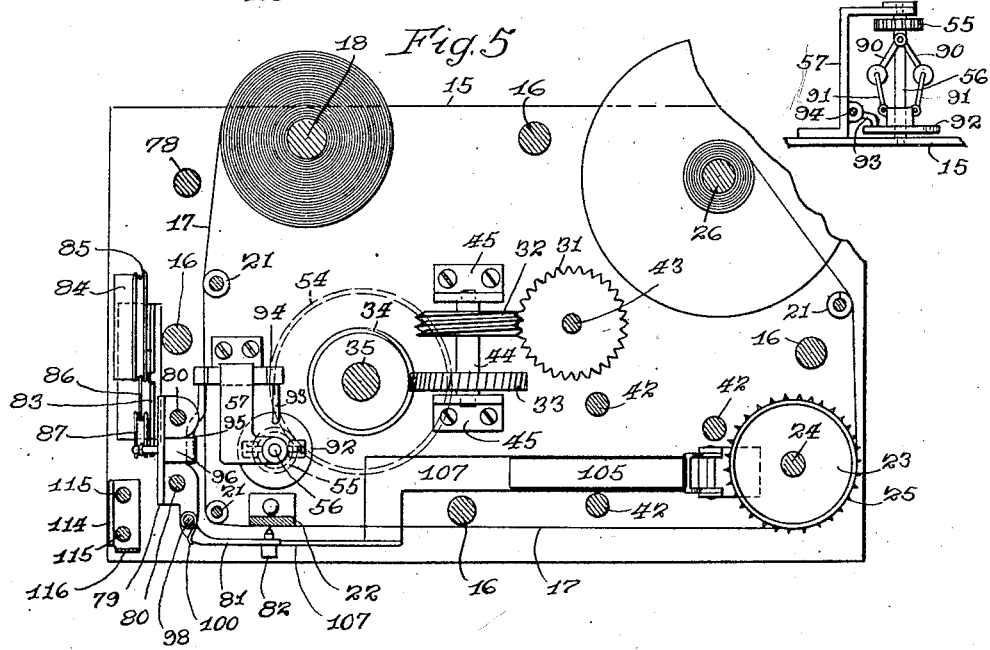
Fig. 4 is a detail view of parts of the primary governor.
Fig. 5 is a horizontal sectional view on the line 5—5 of Fig. 3.

The pencil 82 is moved lengthwise along the length of the platen and so transversely of the sheet in correspondence with the increased speed of rotation of the shaft 35. The carriage 79 is normally held in its lowest position, so that the pencil will record on the zero line of the sheet, by a retracting mechanism including a spring-arm 83 and a spring-drum 84 mounted on a bracket 15ª. The drum is revoluble on the bracket and the arm is pivoted thereon, the drum carrying a sheave 85 to which one end of a flexible cord 86 is secured, its opposite end being led over a guide-sheave 87 on the free end of arm 83 and secured to the carriage. The spring 88 of the drum is secured at one end to the drum and at its opposite end to a screw 89 in the bracket 15ª which may be turned and set to govern the tension of the spring 88 which is somewhat in excess of the tension of the spring 841. The pivoted arm 83 is retracted to its initial position by the light spring 841 on the bracket, and the bracket is provided with a pin 842 in the path of the arm; when the carriage 79 makes its initial movement away from its zero position the cord raises the arm 83 against the slight tension of its spring 841, and as the carriage continues to move the arm contacts with the pin 842 and brings the spring 88 into action. The resistance of the spring 841 is less than that of spring 88 because the initial upward movement of the carriage 79 is controlled by a primary governor consisting of a pair of light governor-arms 90 pivoted at their upper ends on the shaft 56 and connected at their lower ends by links 91 to a plate 92 revolubly and slidably mounted on the shaft 56 to rise and fall under the influence of the governor-arms 90. A rocker-arm 93 rests at its free end on the plate 92 and is fixed at its other end to a short rock-shaft 94 mounted on the lower portion of the bracket 57 and oscillated as the plate 92 moves up and down. The rock-shaft carries a forwardly projecting rocker-arm 95 which movably engages the under surface of a roller 96 carried by a depending arm 97 on the carriage. When the shaft 35 is rotated at slow speed, say at a speed corresponding to the speed of the associated vehicle up to six or seven miles an hour, the weighted governor arms 61 do not move outwardly but remain in their inoperative position shown in Fig. 3 so that the clutch 69 locks the gear 54 to the shaft 35, and the shaft 56 of the primary governor is revolved. The governor-arms 90 are correspondingly moved outwardly to raise the plate 92 and cause the rocker-arms 93 and 95 to transmit its motion to the carriage to cause the pencil 82 to rise and register the low-speed variations on the sheet. The secondary governor-arms 61 begin to move outwardly when the vehicle speed reaches a predetermined speed, say six or seven miles per hour, but by reason of the lost-motion connection by the elongated slots in links 66 these arms do not cause the sleeve 58 to rise sufficiently to pick up the collar 68 and release the clutch 69 from the gear 54 until a higher vehicle-speed is attained, say ten miles an hour. The primary governor therefore operates the carriage 79 up to a predetermined speed, say six or seven miles an hour, and the secondary governor gradually approaches its operative position to pick up the carriage without any sudden effect on the latter and so without causing the pencil to jump or vibrate. After the secondary governor picks up the carriage both governors operate the carriage in order to provide a smooth transmission of power from one to the other until the speed reaches such point, say ten miles per hour, where the secondary governor-arms are moved outwardly sufficient to raise the clutch 69 out of engagement with the gear 54, when the latter is disconnected from the shaft 35, the primary governor ceases to act and its rocker-arm 95 drops to its inoperative position and the secondary governor by its rocker-arms 72 and 75 operates the bell-crank 76 to raise the carriage to register the speed. When the speed is correspondingly reduced the clutch 69 again engages the gear 54 to again operate the primary governor down to the stoppage of the vehicle, and when this latter occurs the spring-drum draws the carriage to its lowermost position with the pencil on the zero line of the sheet. The primary governor shaft rotates faster than the shaft 35, as before explained by reason of the ratio of gears 54 and 55, and so the primary governor responds immediately to the initial movement of shaft 35 and obtains accuracy of registration at all speeds within its range. The governor arms 61 being doubly counter-balanced prevent any accidental vibrating or moving the pencil when the latter is operated by either governor, so that neither vibrations of the vehicle nor jolts or shocks can cause the recording arm to vibrate or jump. The record sheet as illustrated in Fig. 1 is ruled by cross lines into squares and marked lengthwise to indicate the number of miles traveled and cross-wise to indicate the miles per hour. While the record sheet is traveling across the glass panel and propelled by its actuating mechanism, the pencil 82 is shifted in correspondence with the speed of the vehicle in a direction transversely of the sheet to indicate thereon the number of miles traveled and the speed of miles per hour.

The pencil-arm 81 preferably is pivoted to the carriage 79 and is spring-pressed against the paper. It is pivoted to an upright rod 98 mounted in ears 99 of the carriage, and a spring 100 coiled on the rod presses the pencil against the paper. By this construction the wear of the pencil is taken-up so that its point always engages the paper, and the arm 81 may be swung away from the paper to renew the pencil.

The plate 41 bears upon its lower side a pair of electro-magnets 101 in a parallel electrical circuit with the tail-lamp 102 so that when the switch 103 is turned to light the lamp the magnets will be energized; the dash lamp 104 is usually in circuit with the tail-light. An armature 105 is pivotally mounted upon a standard 106 on the lower plate 15 and is adapted to be attracted by the magnets when the latter are energized. The free end of the armature carries a lever 107 which projects to a point below the pencil 82 and within the area of the glass-panel where it terminates in a second pencil or marker 108. The record sheet is provided with a horizontal line along its lower margin dividing it into upper and lower portions designated respectively as the "night" and "day" record area, and the arrangement of parts is such that when the magnets are de-energized the armature and its associated lever will occupy such position that the pencil 108 will make its record upon the day area, and when the magnets are energized to raise the armature and its associated pencil the latter will make its record upon the night area, the change of position of the pencil being governed by the opening and closing of the circuit through the magnets and being uninfluenced by the tail-light.

A lever 109 is pivoted in a bracket 110 on the support 78 outside the lever 75 and carries a contact plate 111 in the path of a lateral contact pin 112 on the long arm 76$^a$ of the bell-crank lever, these contacts being the normally open terminals of a suitable local electrical circuit controlling any appropriate alarm device and if desired a suitable circuit-breaker to interrupt the ignition circuit of the motor. The lever 109 has a spring 113 to hold its free end down on a control-frame 114 sliding on guides 115. The frame has an upwardly and forwardly projecting spring-arm 116 provided with a handle 117 extending outwardly through a vertical slot 118 in the front wall of the case and with a pin 119 to project into and detachably engage any one of a series of lateral notches 120 in the slot corresponding with the speed lines or marks on the record sheet. The shank of the knob or handle 117 is long enough to allow the knob to play back and forth, and by pressing the knob inwardly the pin 119 is withdrawn from the plane of the notches so that the frame may be freely moved up or down, while when the knob is released at any of the notches the pin will be forced into the notch by the spring-action of the arm 116. The frame 114 and contact 111 may thus be set to the mark of any desired speed and when this speed is attained the contact pin 112 will strike the contact plate 111 and close the circuit through the alarm or ignition-control device. By this means when any desired speed limit is reached the ignition circuit of the motor will be short-circuited or interrupted to stop the motor of the vehicle. Also, if the handle 117 be set at the notch 120 corresponding with the zero speed-mark the motor cannot be started as the local circuit is then closed by the lever 109 being depressed by its spring 113 to engage the contacts 111 and 112, and the ignition circuit of the motor is broken. In practice we prefer to interpose a spring-contact 121 between the contacts 111 and 112, this contact 121 forming a terminal of a normally open local circuit including the bell or other alarm device whose other terminal is the pin 112. This contact 121 may be conveniently carried by the lever 109 normally out of engagement with contact 111, and when the contact 112 strikes the contact 121 the alarm circuit will be closed to operate the alarm, while the further movement of contact 112 will cause the spring-contact 121 to yield to allow the contacts 111 and 112 to close their circuit.

The control-frame 114 may be locked in any position by a sliding-block 122 which may be moved into position behind the offset of the spring-arm 116 which carries the pin 119 to lock the pin in any of the notches 120. The block 122 extends the length of the slot 118 and its edge toward the arm 116 is notched to correspond with the notches 120 so that when the block is moved behind the offset of the arm the corresponding notch in the block will engage and lock the pin. The block has offset arms having elongated slots 123 by which it is movably carried on studs 124 on the inner face of the front wall 11 of the case. The block normally stands away from the offset of the arm 116 and is moved to its position behind the offset by a vertically sliding plate 125 mounted on the inner face of the front 11 by studs 126 thereon engaging the elongated slots 127 in the plate, suitable oppositely-acting cam-faces 128 on the block and 129 on the plate moving the block behind the arm 116 when the plate is moved upwardly and withdrawing the block when the plate is moved downwardly. The plate 125 may be moved upwardly by the cam-face of a disk 130 when the disk is moved to a given position and may drop by gravity behind the shoulder of the cam when the latter is moved from such position, and the movement of the cam-disk may be controlled by a suitable rotating barrel 131 which in practice is preferably the hub of a suitable lock 132. By this organization the plate 125 is in effect the bolt of a lock. The control-frame may be locked at its lowest position to keep the contacts 111 and 112 engaged to interrupt the ignition circuit and so prevent unwarranted use of the motor, or it may be locked at any speed position to stop the motor when such speed is attained.

The front wall of the case is provided with a series of figures corresponding with the marks on the sheet indicating the speed of miles per hour, and also with a series of pointers 133 opposite these figures and marks. The marker 82 also is preferably provided with a pointer 134 to register with the pointers 133 so that the speed may be easily read by the operator.

In operation the speed of the shaft 35 varies with the speed of the vehicle, and by the train of gears the winding shaft 24 is actuated at proportionate speed to move the sheet across the platen and glass-panel, the take-up roller 18 keeping the sheet taut. The governor mechanism operates to correspondingly shift the marker 82, the primary governor being sufficient to raise the carriage against the retracting force of the light spring 84$^1$, and the secondary governor being sufficient to raise it against the retracting force of the spring 88, and the marker 82 indicates on the record sheet a complete record of the speed at which the vehicle travels as well as the distance between the stops. When the vehicle stops, the recording mechanism stops with the terminal end of the record-line on the sheet showing the speed at which the vehicle was traveling when it stopped. The auxiliary marker 108 shows on its associated areas on the record-sheet whether the travel was by day or night. The controller 114 may be set to lock the vehicle against improper use, and to afford an alarm or automatic stop when any speed is attained.

While the pivoted arm 83 and its spring 841 may conveniently be employed for the primary governor, it is obvious that this spring may be omitted and the arm rigidly mounted on the frame so that the initial movement of the carriage 79 by the primary governor will be made against the comparatively light resistance of the outer coil of the spring 88 and its movement by the secondary governor against the stronger resistance of the inner coils of spring 88, and that in either case the carriage is spring-pressed to return to its zero position when the governor mechanism ceases to act. Other changes in details may be made without departing from our invention.

We claim:—

1. In a speed recorder for vehicles, a traveling record sheet, means for imparting motion to said sheet, a marker in contact with the sheet, and speed-controlled governor mechanism for shifting said marker transversely of the path of movement of said sheet comprising a primary governor for low speeds from initial movement to a predetermined speed and a secondary governor for higher speeds, and means to connect the primary and secondary governors at a predetermined speed of the former.

2. In a speed recorder for vehicles, a traveling record sheet, driving means for imparting motion to said sheet, a marker in contact with the sheet, and speed-controlled governor mechanism for shifting said marker transversely of the path of movement of said sheet comprising a primary governor for low speeds from initial movement to a predetermined speed, a secondary governor for higher speeds, a clutch between the driving means and primary governor, and connections between the clutch and secondary governor to open and close the clutch.

3. In a speed recorder for vehicles, a traveling record sheet, driving means for imparting motion to said sheet, a marker in contact with the sheet, and speed-controlled governor mechanism for shifting said marker transversely of the path of movement of said sheet comprising a governor adapted to operate from initial speed of the sheet to a predetermined speed, a clutch between the governor and driving means, a second governor adapted to operate at a predetermined speed of the sheet, and connections between the clutch and second governor to respectively open and close the clutch above and below said predetermined speed.

4. In a speed recorder for vehicles, a traveling record sheet, driving means for imparting motion to said sheet, a marker in contact with the sheet, and speed-controlled governor mechanism for shifting said marker transversely of the path of movement of said sheet comprising a reciprocating element, a governor to move said element when operating at a predetermined speed, another governor, a clutch opened and closed by the movements of said element, and connections between the said last governor and the clutch to operate the former when the latter is closed.

5. In a speed recorder for vehicles, a traveling record sheet, a drive shaft, means for imparting motion to said sheet, a marker, and speed-controlled governor mechanism for shifting said marker transversely of the path of movement of said sheet comprising a sleeve on the shaft rotating therewith and movable longitudinally thereon, a governor adapted to become operative at a predetermined speed and connected to the sleeve to move it along the shaft, a collar loose on the shaft, a clutch closed and opened respectively by said sleeve to couple and uncouple said sleeve and collar, a gear on the collar and another governor operated by said gear when the clutch is closed.

6. In a speed recorder for vehicles, a traveling record sheet, a drive shaft, means for imparting motion to said sheet, a marker, and speed-controlled governor mechanism for shifting said marker transversely of the path of movement of said sheet comprising a sleeve on the shaft rotating therewith and movable lengthwise thereon, a governor to move said sleeve when operating at a predetermined speed, a collar on the shaft rotating therewith and movable longitudinally thereon, lost-motion connections between the collar and sleeve, a second collar loose on the shaft and having a gear, a clutch between the collars, and another governor operated by said gear when the clutch is closed.

7. In a speed recorder for vehicles, a traveling record sheet, means for imparting motion to said sheet, a marker in contact with the sheet, a speed-controlled governor mechanism for shifting said marker transversely of the path of movement of said sheet comprising a primary governor for low speeds and a secondary governor for higher speeds, and means to operate the primary governor faster than the secondary governor.

8. In a speed recorder for vehicles, a traveling record sheet, means for imparting motion to said sheet, a marker in contact with the sheet, a speed-controlled governor mechanism for shifting said marker transversely of the path of movement of said sheet comprising a primary governor for low speeds and a secondary governor for higher speeds, means to operate the primary governor faster than the secondary governor, and means to gradually connect the secondary governor to the primary governor as the former approaches its operative position.

9. In a speed recorder for vehicles, a traveling record sheet, driving means for imparting motion to said sheet including a feeding drum, drive shaft and mechanical connections between said shaft and drum, a removable take-up roll for winding up said record sheet, and an elastic drive-belt between the take-up roll and driving means.

10. In a speed recorder for vehicles, a traveling record sheet, driving means for imparting motion to said sheet including a feeding drum having peripheral pins, a drive shaft and mechanical connections between said shaft and drum, a removable take-up roll for winding up said record sheet, and an elastic drive-belt between the take-up roll and driving means.

11. In a speed recorder for vehicles, a traveling record sheet having a mark to indicate day and night divisions, means for imparting motion to said sheet, a marker, and speed-controlled governor mechanism for shifting said marker transversely of the path of movement of said sheet, and a second marker adjustable to two positions transversely of said mark to record on either of said divisions of said sheet.

12. In a speed recorder for vehicles, a traveling record sheet having a mark to indicate day and night divisions, means for imparting motion to said sheet, a marker, and speed-controlled governor mechanism for shifting said marker transversely of the path of movement of said sheet, and an electro-magnetically controlled marker to record in either of two paths on opposite sides of said mark.

13. In a speed recorder for vehicles, a traveling record sheet having a mark to indicate day and night divisions, means for imparting motion to said sheet, a marker, and speed-controlled governor mechanism for shifting said marker transversely of the path of movement of said sheet, a second marker to record lengthwise on the sheet, and electro-magnetic devices to shift the second marker transversely of the mark.

14. In a speed recorder for vehicles, a traveling record sheet having a line to indicate day and night divisions, means for imparting motion to said sheet, a marker in contact with said sheet, a second marker to record lengthwise on the sheet, electro-magnetic devices to shift the second marker transversely of the day and night line on the sheet, an electric light, a circuit including said light and magnets, and a switch in said circuit.

15. In a speed recorder for vehicles, a traveling record sheet, means for imparting motion to said sheet, a marker, and speed-controlled governor mechanism for shifting said marker transversely of the path of movement of said sheet including a lever carrying a terminal of a normally open local electrical circuit, a control-frame adjustable to different positions transversely of said sheet, and a second terminal of said circuit positioned in the path of said first terminal by said frame.

16. In a speed recorder for vehicles, a traveling record sheet, means for imparting motion to said sheet, a marker, and speed-controlled governor mechanism for shifting said marker transversely of the path of movement of said sheet including a lever carrying a terminal of a normally open local electrical circuit, a circuit-breaker controlled by said circuit, a control-frame adjustable to different positions transversely of the sheet, a second lever carying the other terminal of said local circuit in the path of said first terminal and positioned by the frame, and a light spring-contact carried by said first lever in the path of said terminals and forming the terminal of a local alarm circuit whose other terminal is formed by the terminal on said first lever.

17. In a speed recorder for vehicles, a case having an elongated slot in its front wall provided with lateral notches, a traveling record sheet having speed-indicating marks corresponding with said notches, means for imparting motion to said sheet, a marker in contact with the sheet, and speed-controlled governor mechanism for shifting said marker transversely of the path of movement of said sheet, a control-frame adjustable to different positions transversely of said sheet corresponding to said speed-indicating marks, and a spring-arm on the frame having a knob projecting through said slot and a setting pin to enter any of said notches.

18. In a speed recorder for vehicles, a case having an elongated slot in its front wall provided with lateral notches, a traveling record sheet having speed-indicating marks corresponding with said notches, means for imparting motion to said sheet, a marker in contact with the sheet, and speed-controlled governor mechanism for shifting said marker transversely of the path of movement of said sheet, a control-frame adjustable to different positions transversely of said sheet corresponding to said speed-indicating marks, a spring-arm on the frame having a knob projecting through said slot and setting pin to enter any of said notches, and locking-means in the case and operated from the front thereof to hold the pin in any notch.

19. In a speed recorder for vehicles, a case having an elongated slot in its front wall provided with lateral notches, a traveling record sheet, means for imparting motion to said sheet, a marker, speed-controlled governor mechanism for shifting said marker transversely of the path of movement of said sheet, a control-frame adjustable to different positions transversely of said sheet, a spring arm on the frame having a knob projecting through said slot and a pin to enter any of said notches, a block movable into and out of the path of the arm, and means to move the block.

20. In a speed recorder for vehicles, a case having an elongated slot in its front wall provided with lateral notches, a traveling record sheet, means for imparting motion to said sheet, a marker, speed-controlled governor mechanism for shifting said marker transversely of the path of movement of said sheet, a control-frame adjustable to different positions transversely of said sheet, a spring arm on the frame having a knob projecting through said slot and a pin to enter any of said notches, a block movable into and out of the path of the arm, a cam-plate to move the block, and a cam-disk to govern the plate.

21. In a speed recorder for vehicles, a case having an elongated slot in its front wall provided with lateral notches, a traveling record sheet, means for imparting motion to said sheet, a marker, speed-controlled governor mechanism for shifting said marker transversely of the path of movement of said sheet, a control-frame adjustable to different positions transversely of said sheet, a spring arm on the frame having a knob projecting through said slot and a pin to enter any of said notches, a block movable into and out of the path of the arm, a plate to move the block, and a lock for the plate.

22. In a speed recorder for vehicles, a case having an elongated slot in its front wall provided with lateral notches, a traveling record sheet, means for imparting motion to said sheet, a marker, and speed-controlled governor mechanism for shifting said marker transversely of the path of movement of said sheet including a lever carrying a terminal of a normally open local electrical circuit, a control-frame adjustable to different positions transversely of said sheet, a second terminal of said circuit positioned in the path of said first terminal by said frame, and a spring arm on said frame carrying a knob projecting through said slot and a pin to enter any of said notches.

23. In a speed recorder for vehicles, a case having an elongated slot in its front wall provided with lateral notches, a traveling record sheet, means for imparting motion to said sheet, a marker, and speed-controlled governor mechanism for shifting said marker transversely of the path of movement of said sheet including a lever carrying a terminal of a normally open local electrical circuit, a control-frame adjustable to different positions transversely of said sheet, a second terminal of said circuit positioned in the path of said first terminal by said frame, and a spring arm on said frame carrying a knob projecting through said slot and a pin to enter any of said notches.

24. In a speed recorder for vehicles, a case having an elongated slot in its front wall provided with lateral notches, a traveling record sheet, means for imparting motion to said sheet, a marker, and speed-controlled governor mechanism for shifting said marker transversely of the path of movement of said sheet including a lever carrying a terminal of a normally open local electrical circuit, a control-frame adjustable to different positions transversely of said sheet, a second terminal of said circuit positioned in the path of said first terminal by said frame, a spring arm on said frame carrying a knob projecting through said slot and a pin to enter any of said notches, and locking-means in the case and operated from the front thereof to lock the pin in any notch.

25. In a speed recorder for vehicles, a case having an elongated slot in its front wall provided with lateral notches, a traveling record sheet, means for imparting motion to said sheet, a marker, and speed-controlled governor mechanism for shifting said marker transversely of the path of movement of said sheet including a lever carrying a terminal of a normally open local electrical circuit, a control-frame adjustable to different positions transversely of said sheet, a second terminal of said circuit positioned in the path of said first terminal by said frame, a spring arm on said frame carrying a knob projecting through said slot and a pin to enter any of said notches, a block movable into and out of engagement with the pin, a plate to move the block, and a lock for the plate.

In testimony whereof we affix our signatures in presence of two witnesses.

CHARLES A. JESKE.
CLARENCE P. JESKE.

Witnesses:
J. McRoberts,
Edith Wilcox.